United States Patent
Fuji

(10) Patent No.: US 8,937,678 B2
(45) Date of Patent: Jan. 20, 2015

(54) IMAGING APPARATUS, CONTROL METHOD THEREOF, AND PROGRAM

(71) Applicant: Sony Corporation, Tokyo (JP)

(72) Inventor: Tetsuya Fuji, Kanagawa (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/670,088

(22) Filed: Nov. 6, 2012

(65) Prior Publication Data

US 2013/0135509 A1 May 30, 2013

(30) Foreign Application Priority Data

Nov. 30, 2011 (JP) ................... 2011-261108

(51) Int. Cl.
*H04N 5/222* (2006.01)
*H04N 5/232* (2006.01)

(52) U.S. Cl.
CPC ....... *H04N 5/23241* (2013.01); *H04N 5/23293* (2013.01)
USPC ............ 348/333.13; 348/208.16; 348/333.04; 348/372; 455/127.5

(58) Field of Classification Search
None
See application file for complete search history.

(56) References Cited

U.S. PATENT DOCUMENTS

| | | | | |
|---|---|---|---|---|
| 6,031,999 A * | 2/2000 | Ogawa | ........................... | 396/303 |
| 6,522,361 B2 * | 2/2003 | Higuchi et al. | ............... | 348/372 |
| 6,710,809 B1 * | 3/2004 | Niikawa | ........................ | 348/372 |
| 7,148,655 B2 * | 12/2006 | Ebato et al. | .................... | 320/132 |
| 7,773,147 B2 * | 8/2010 | Chuang | .......................... | 348/372 |
| 7,961,248 B2 * | 6/2011 | Kojima | .......................... | 348/372 |
| 8,125,556 B2 * | 2/2012 | Park et al. | ................ | 348/333.04 |
| 8,289,442 B2 * | 10/2012 | Hirai | .............................. | 348/372 |
| 8,538,484 B2 * | 9/2013 | Chan et al. | .................... | 455/566 |
| 2005/0062878 A1 * | 3/2005 | Ogawa et al. | ................. | 348/372 |
| 2005/0156572 A1 * | 7/2005 | Nunomaki et al. | ........... | 320/132 |
| 2006/0075268 A1 * | 4/2006 | Kim et al. | ..................... | 713/300 |
| 2006/0095800 A1 * | 5/2006 | Iwamoto | ....................... | 713/300 |
| 2008/0268828 A1 * | 10/2008 | Nagaraja | ....................... | 455/419 |
| 2008/0307243 A1 * | 12/2008 | Lee | ................................ | 713/320 |
| 2009/0102965 A1 * | 4/2009 | Ogawa | ........................... | 348/372 |
| 2011/0040996 A1 * | 2/2011 | Hackborn et al. | ............ | 713/340 |
| 2011/0109613 A1 * | 5/2011 | Asai et al. | ..................... | 345/211 |

FOREIGN PATENT DOCUMENTS

JP        2011-133488        7/2011

* cited by examiner

*Primary Examiner* — Twyler Haskins
*Assistant Examiner* — Wesley J Chiu
(74) *Attorney, Agent, or Firm* — Oblon, Spivak, McClelland, Maier & Neustadt, L.L.P.

(57) ABSTRACT

An imaging apparatus includes a calculation unit that calculates power consumptions related to a plurality of functions during a predetermined period for the respective functions; and a control unit that performs control to display data of the calculated power consumptions for the respective functions and countermeasures to be used to reduce the power consumptions related to a predetermined number of functions among the plurality of functions, on a display unit.

18 Claims, 12 Drawing Sheets

FIG. 4

| FUNCTION | RATED POWER CONSUMPTION |
|---|---|
| STILL IMAGE RECORD | W1(mW) |
| VIDEO RECORD | W2(mW) |
| ZOOM CONTROL | W3(mW) |
| FOCUS CONTROL | W4(mW) |
| CAMERA SHAKING CORRECTION | W5(mW) |
| FLASH CONTROL | W6(mW) |
| ... | ... |

FIG. 5

| FUNCTION | OPERATIONAL INSTRUCTION HISTORY INFORMATION |||||||| |
|---|---|---|---|---|---|---|---|---|
| STILL IMAGE RECORD | 1 | 1 | 1 | 1 | 0 | 0 | 0 | ... |
| VIDEO RECORD | 0 | 0 | 0 | 0 | 1 | 1 | 1 | ... |
| ZOOM CONTROL | 1 | 0 | 1 | 0 | 0 | 0 | 1 | ... |
| FOCUS CONTROL | 1 | 0 | 0 | 0 | 1 | 0 | 1 | ... |
| CAMERA SHAKING CORRECTION | 0 | 1 | 1 | 0 | 1 | 0 | 0 | ... |
| FLASH CONTROL | 1 | 0 | 1 | 1 | 0 | 0 | 0 | ... |
| ... | ... | ... | ... | ... | ... | ... | ... | ... |

TIME t

FIG. 6A

| FUNCTION | OPERATION TIME |
|---|---|
| STILL IMAGE RECORD | T1(min) |
| VIDEO RECORD | T2(min) |
| ZOOM CONTROL | T3(min) |
| FOCUS CONTROL | T4(min) |
| CAMERA SHAKING CORRECTION | T5(min) |
| FLASH CONTROL | T6(min) |
| ... | ... |

FIG. 6B

| FUNCTION | POWER CONSUMPTION |
|---|---|
| STILL IMAGE RECORD | W11(mW) |
| VIDEO RECORD | W22(mW) |
| ZOOM CONTROL | W33(mW) |
| FOCUS CONTROL | W44(mW) |
| CAMERA SHAKING CORRECTION | W55(mW) |
| FLASH CONTROL | W66(mW) |
| ... | ... |

FIG. 7

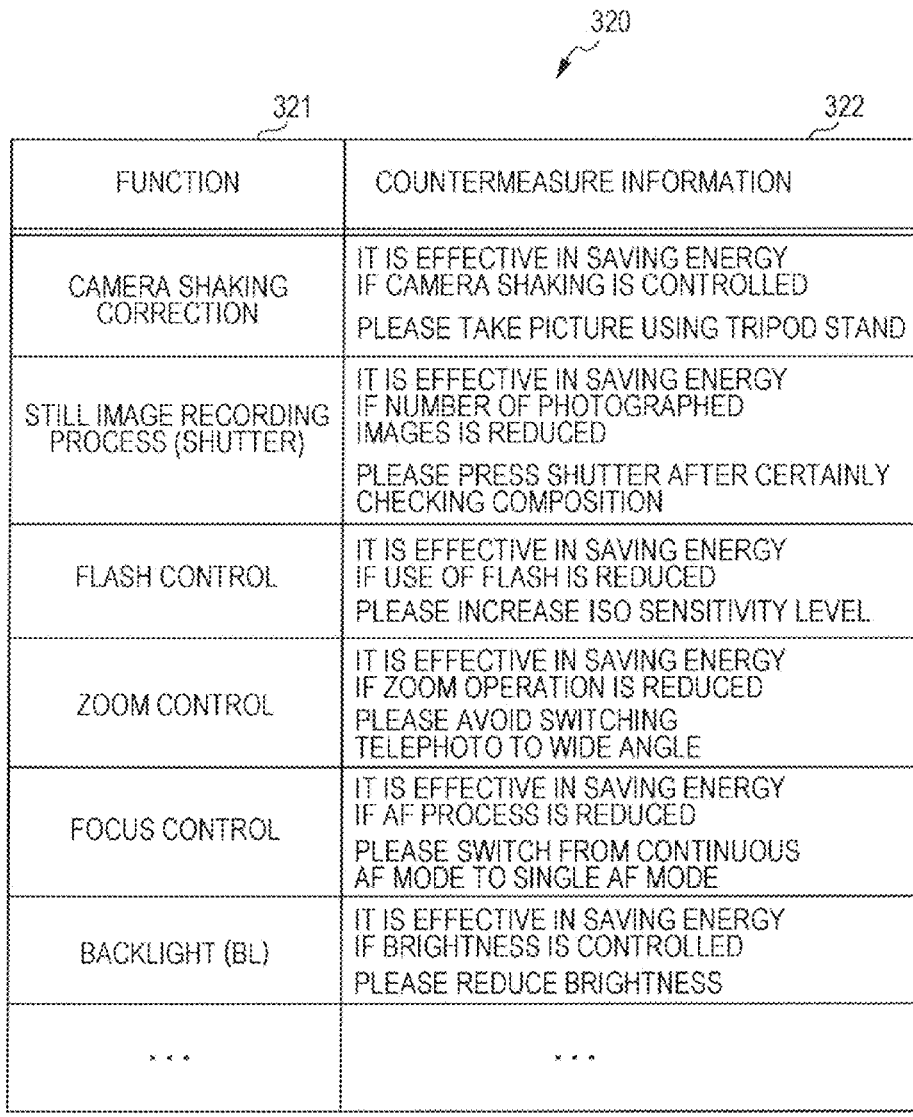

| FUNCTION | COUNTERMEASURE INFORMATION |
|---|---|
| CAMERA SHAKING CORRECTION | IT IS EFFECTIVE IN SAVING ENERGY IF CAMERA SHAKING IS CONTROLLED<br>PLEASE TAKE PICTURE USING TRIPOD STAND |
| STILL IMAGE RECORDING PROCESS (SHUTTER) | IT IS EFFECTIVE IN SAVING ENERGY IF NUMBER OF PHOTOGRAPHED IMAGES IS REDUCED<br>PLEASE PRESS SHUTTER AFTER CERTAINLY CHECKING COMPOSITION |
| FLASH CONTROL | IT IS EFFECTIVE IN SAVING ENERGY IF USE OF FLASH IS REDUCED<br>PLEASE INCREASE ISO SENSITIVITY LEVEL |
| ZOOM CONTROL | IT IS EFFECTIVE IN SAVING ENERGY IF ZOOM OPERATION IS REDUCED<br>PLEASE AVOID SWITCHING TELEPHOTO TO WIDE ANGLE |
| FOCUS CONTROL | IT IS EFFECTIVE IN SAVING ENERGY IF AF PROCESS IS REDUCED<br>PLEASE SWITCH FROM CONTINUOUS AF MODE TO SINGLE AF MODE |
| BACKLIGHT (BL) | IT IS EFFECTIVE IN SAVING ENERGY IF BRIGHTNESS IS CONTROLLED<br>PLEASE REDUCE BRIGHTNESS |
| . . . | . . . |

IMAGING APPARATUS, CONTROL METHOD THEREOF, AND PROGRAM

BACKGROUND

The present technology relates to an imaging apparatus. In particular, the present technology relates to an imaging apparatus that performs various types of operations using a battery, a control method thereof, and a program that causes a computer to perform the corresponding method.

In related art, imaging apparatuses which generate images (image data) by imaging an object and record the generated images as image content (an image file) have been widespread. In addition, in recent years, small-sized imaging apparatuses which can be easily carried by users have been widely spread. Such an imaging apparatus, which can be carried, performs each operation using a battery in many cases, thus it is important to effectively use the battery.

For example, electronic apparatuses have been proposed which calculate the available time of a battery for each operating mode and display the residual amount of the battery and the available time corresponding to each operating mode (for example, refer to Japanese Unexamined Patent Application Publication No. 2011-133488).

SUMMARY

In the above-described related technology, the residual amount of a battery and each available time are displayed. Therefore, for example, a user can perform an imaging operation while checking the residual amount of the battery and each available time.

Here, when an imaging operation is performed using an imaging apparatus, different functions are used by users. Therefore, the power consumption per unit time differs from each other depending on the user who uses the imaging apparatus. Therefore, it is important to effectively use a battery by using an appropriate countermeasure depending on the user who uses the imaging apparatus.

It is desirable to efficiently use a battery.

According to an embodiment of the present technology, there is provided an imaging apparatus including a calculation unit that calculates power consumptions related to a plurality of functions during a predetermined period for the respective functions; and a control unit that performs control to display data of the calculated power consumptions for the respective functions and countermeasures to be used to reduce the power consumptions related to a predetermined number of functions among the plurality of functions, on a display unit, a control method thereof, and a program that causes a computer to perform the corresponding method. Therefore, the operation is performed to calculate the power consumptions related to the plurality of functions during the predetermined period for the respective functions, and display the calculated power consumptions for the respective functions and countermeasures, used to reduce the power consumptions related to the predetermined number of functions among the plurality of functions.

In addition, according to the embodiment of the present technology, the control unit may perform control to display the countermeasures related to functions which satisfy a predetermined condition among the plurality of functions on the display unit. Therefore, the operation is performed to display the countermeasures related to the functions which satisfy the predetermined condition among the plurality of functions.

In addition, according to the embodiment of the present technology, the control unit may employ one or more functions having the calculated power consumptions which are higher than a predetermined value used as a reference, as functions which satisfy the predetermined condition, and may perform control to display the countermeasures related to the functions which satisfy the predetermined condition on the display unit. Therefore, the operation is performed to consider one or more functions, having the calculated power consumptions which are higher than the predetermined value used as the reference, as functions which satisfy the predetermined condition, and display the countermeasures related to the functions which satisfy the predetermined condition.

In addition, according to the embodiment of the present technology, the control unit may perform control to distinguishably display the calculated power consumptions for the respective functions on the display unit. Therefore, the operation is performed to distinguishably display the calculated power consumptions for the respective functions.

In addition, according to the embodiment of the present technology, when a residual amount of a battery which is built in or mounted on the imaging apparatus is lower than a predetermined value used as a reference, the control unit may perform control to display the data of the power consumptions for the respective functions and the countermeasures related to the predetermined number of functions on the display unit. Therefore, when the residual amount of the battery is lower than the predetermined value used as the reference, the operation is performed to display the power consumptions for the respective functions and the countermeasures related to the predetermined number of functions.

In addition, according to the embodiment of the present technology, when a residual amount of a battery which is built in or mounted on the imaging apparatus is lower than a predetermined value used as a reference, the control unit may perform control to display a manipulation screen on the display unit, on which either a first manipulation which displays the data of the power consumptions for the respective functions and the countermeasures related to the predetermined number of functions or a second manipulation which sets a specific mode to automatically reduce power consumptions related to one or more functions, on the display unit. Therefore, when the residual amount of the battery is lower than the predetermined value used as the reference, the operation is performed to display the manipulation screen on the display unit, on which either the first manipulation which displays the data of the power consumptions for the respective functions and the countermeasures related to the predetermined number of functions or the second manipulation which sets the specific mode to automatically reduce power consumptions related to one or more functions.

In addition, according to the embodiment of the present technology, the plurality of functions may be capable of being stopped or changed by a manipulation of a user. Therefore, the operation is performed to display the power consumptions related to the functions which are capable of being stopped or changed by the manipulation of the user and the countermeasures used to reduce the power consumptions related to the functions.

In addition, according to the embodiment of the present technology, after the data of the power consumptions for the respective functions and the countermeasures related to the predetermined number of functions are displayed on the display unit, the control unit may perform control to display a menu screen on the display unit for selecting a desired function to be stopped among the plurality of functions. Therefore, the operation is performed to display the menu screen for selecting manipulation which stops the desired function among the plurality of functions after the data of the power consumptions for the respective functions and the countermeasures related to the predetermined number of functions are displayed.

In addition, according to the embodiment of the present technology, the control unit may perform control to display the menu screen on the display unit such that a manipulation region for selecting the predetermined number of functions to be stopped is displayed in a different way from that of another manipulation region for indicating functions not to be stopped. Therefore, the operation is performed to display the menu screen such that the manipulation region for selecting the predetermined number of functions to be stopped is displayed in a different way from that of the another manipulation region for indicating functions not to be stopped.

In addition, according to the embodiment of the present technology, the calculation unit may calculate the power consumptions for the respective functions during a plurality of periods as the predetermined periods for the respective periods, and the control unit may perform control to display the power consumptions for the respective functions, which are calculated during a period selected by a manipulation of a user from among the plurality of periods, on the display unit. Therefore, the operation is performed to calculate the power consumptions for the respective functions during the plurality of periods for the respective periods, and to display the power consumptions for the respective functions, which are calculated during the period selected by the manipulation of the user from among the plurality of periods.

In addition, according to the embodiment of the present technology, when a residual amount of a battery which is built in or mounted on the imaging apparatus is lower than a predetermined value used as a reference, the control unit may perform control to set a specific mode to automatically reduce power consumptions related to one or more functions having the calculated power consumptions which are greater than a predetermined value used as a reference. Therefore, when the residual amount of a battery is lower than the predetermined value used as a reference, the operation is performed to set the specific mode to automatically reduce the power consumptions related to one or more functions having the calculated power consumptions which are greater than the predetermined value used as a reference.

According to the embodiment of the present technology, there is an advantage in that the battery can be effectively used.

BRIEF DESCRIPTION OF THE DRAWINGS

FIG. 4 is a view schematically illustrating an example of the storage content of a rated power consumption information storage unit according to the first embodiment of the present technology;

FIG. 5 is a view schematically illustrating an example of content stored in an operational instruction information storage unit according to the first embodiment of the present technology;

FIGS. 6A and 6B are simplified views illustrating examples of the operation time of each function and the power consumption of each function which are calculated using a power consumption calculation unit according to the first embodiment of the present technology;

FIG. 7 is a view schematically illustrating an example of content stored in a countermeasure information storage unit according to the first embodiment of the present technology;

DETAILED DESCRIPTION OF EMBODIMENTS

Configurations which are used to implement the present technology (hereinafter referred to as "embodiments") will be described below. Further, description will be performed in the following order:

1. First embodiment (display control: an example in which power consumptions related to a plurality of functions are displayed for the respective functions and countermeasures used to reduce the power consumptions are displayed for the respective functions)

2. Modification

1. First Embodiment

Example of Use of Imaging Apparatus

Figure 1A:
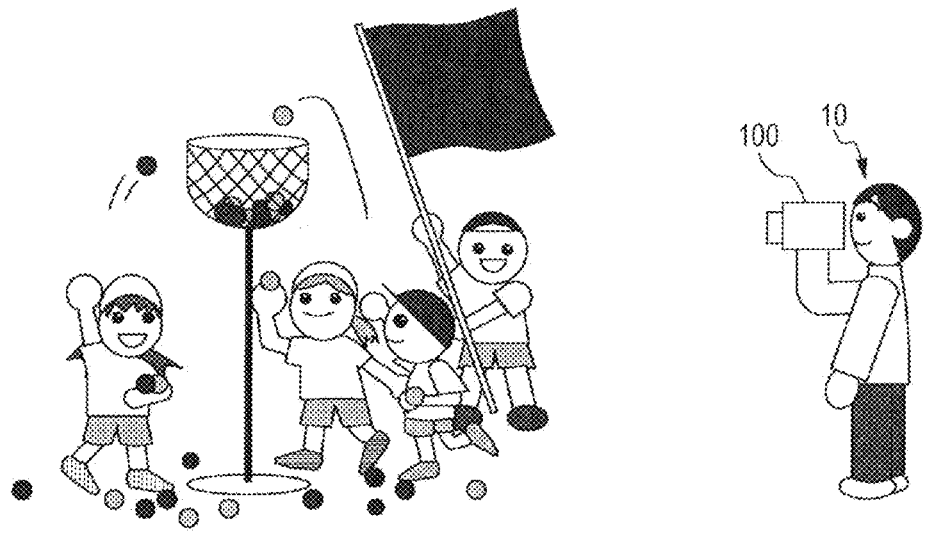
FIGS. 1A and 1B are views illustrating states in which video imaging operations are being performed using an imaging apparatus according to a first embodiment of the present technology.
Figure 1B:
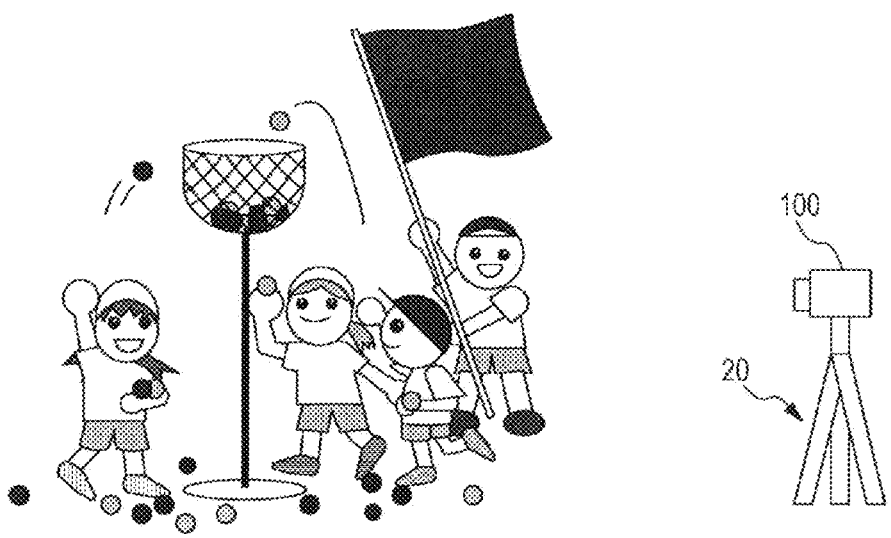

FIGS. 1A and 1B are views illustrating states in which video imaging operations are being performed using an imaging apparatus 100 according to a first embodiment of the present technology.

FIG. 1A illustrates a state in which a user 10 performs a video imaging operation while holding the imaging apparatus 100 in the hand. As shown in FIG. 1A, when the user 10 performs the video imaging operation while holding the imaging apparatus 100 in the hand, the user 10 can freely move. Therefore, the user can perform the video imaging operation while moving to a desired location. However, when the video imaging operation is performed as described above, camera shaking occurs. Therefore, it is assumed that a large number of camera shakings are corrected.

FIG. 1B illustrates a state in which the video imaging operation is performed while the imaging apparatus 100 is fixed on a tripod stand 20. As shown in FIG. 1B, when the video imaging operation is performed while the imaging apparatus 100 is fixed on the tripod stand 20, camera shaking hardly occurs. Therefore, it is assumed that a small number of camera shakings are corrected.

Here, for example, it is assumed that the residual amount of the battery of the imaging apparatus 100 is low when the user 10 performs the video imaging operation while holding the imaging apparatus 100 in the hand as shown in FIG. 1A. In this case, for example, it is assumed that the user 10 continuously performs the imaging operation while watching the indication of the residual amount of the battery or turns off the power, thus the battery is prevented from running out during the imaging operation. In this case it is assumed that, for example, if the user 10 can easily know an available countermeasure used to control the power consumption of the battery, the probability that the user 10 can satisfactorily complete an imaging operation before the battery runs off will increase.

For example, if the camera shaking correction function is frequently operated when the user 10 performs the video imaging operation while holding the imaging apparatus 100 in the hand as shown in FIG. 1A, it is assumed that the power consumption of the battery comparatively increases. In this case, it is assumed that the operation of the camera shaking correction function can be reduced by performing the video imaging operation in the state in which the imaging apparatus 100 is fixed on the tripod stand 20 as shown in FIG. 1B.

Here, the first embodiment of the present technology shows an example in which, when the residual amount of the battery of the imaging apparatus 100 is low, a record of the power consumption of the battery for each function can be notified and an available countermeasure for reducing the power consumption of the battery can also be notified.

Example of Internal Configuration of Imaging Apparatus

Figure 2:
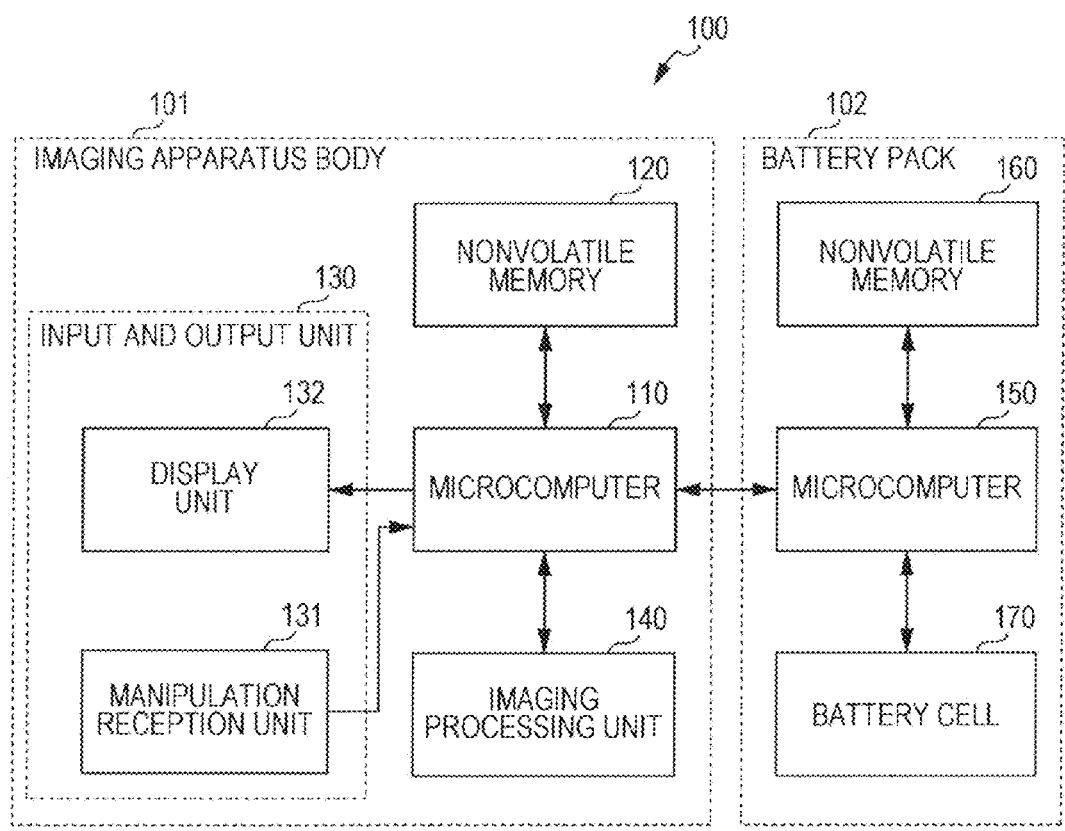
FIG. 2 is a block diagram illustrating an example of the internal configuration of the imaging apparatus according to the first embodiment of the present technology.

FIG. 2 is a block diagram illustrating an example of the internal configuration of the imaging apparatus 100 according to the first embodiment of the present technology.

The imaging apparatus 100 includes an imaging apparatus body 101 and a battery pack 102. The battery pack 102 is detachably mounted on the imaging apparatus body 101, and supplies power to the imaging apparatus body 101 via connection terminals (not shown). In addition, the imaging apparatus 100 is implemented using, for example, a digital video camera which generates image data (images) by imaging an object, and records the generated image data as image content (still image content or video content).

The imaging apparatus body 101 includes a microcomputer 110, a nonvolatile memory 120, an input and output unit 130, and an imaging processing unit 140. The imaging processing unit 140 includes a zoom control unit, a focus control unit, a monitor control unit, a flash control unit, an imaging system control unit, and an image processing control unit. However, the diagrammatic representation and the detailed description thereof are omitted here.

The microcomputer 110 is connected to the nonvolatile memory 120, the input and output unit 130, and the imaging processing unit 140, and controls the units. In addition, the microcomputer 110 performs serial communication with the external apparatus (for example, the battery pack 102) of the imaging apparatus body 101.

The nonvolatile memory 120 is used as an operational memory used to process each type of control information or image information. In addition, the nonvolatile memory 120 stores information related to power consumption for each function or information related to the imaging operation. Content stored in the nonvolatile memory 120 will be described in detail with reference to FIGS. 4 and 5.

The input and output unit 130 displays various types of images, receives an input from a user based on the detected state of an object which is close to or comes into contact with a display surface (the display surface of a display unit 132), and includes a manipulation reception unit 131 and a display unit 132. The input and output unit 130 is also called a touch screen or a touch panel.

The manipulation reception unit 131 receives manipulation performed by the user, and outputs a control signal (manipulation signal) to the microcomputer 110 in response to the content of the received manipulation. For example, an electrostatic touch panel (capacitance system) which detects the contact or approach of an object having conductivity (for example, a finger of a person) based on variation in electrostatic capacity can be used as the manipulation reception unit 131. Although only the manipulation reception unit 131 of the input and output unit 130 is shown in the first embodiment according to the present technology, each manipulation may be performed using other manipulation members included in the imaging apparatus 100.

The display unit 132 is a display panel which displays each image based on the control of the microcomputer 110. For example, display screens (for example, the display screens shown in FIGS. 9 and 11) which are used to perform respective manipulations related to the imaging operation or images (so-called through-the-lens images) which are output from the imaging processing unit 140 are displayed on the display unit 132. In addition, for example, image content (for example, a still image file or a video file) to be stored in the nonvolatile memory 120 is displayed on the display unit 132. A display panel, for example, a liquid crystal display (LCD) or an organic electro luminescence (EL) panel can be used as the display unit 132.

The battery pack 102 includes a microcomputer 150, a nonvolatile memory 160, and a battery cell 170.

The microcomputer 150 is connected to the nonvolatile memory 160 and the battery cell 170, and controls the nonvolatile memory 160 and the battery cell 170. In addition, the microcomputer 150 performs serial communication with the external apparatus (for example, imaging apparatus body 101) of the battery pack 102.

The nonvolatile memory 160 is used as an operational memory for each type of control information.

The battery cell 170 is a battery cell which includes a lithium ion battery.

Here, if the battery pack 102 is inserted into the battery box of the imaging apparatus body 101, the connection terminals on the side of the battery pack 102 are connected to the respective connection terminals on the side of the imaging apparatus body 101. With the connection of the respective connection terminals, power is supplied from the battery pack 102 to the imaging apparatus body 101.

In addition, when the connection terminals on the side of the battery pack 102 are connected to the connection terminals on the side of the imaging apparatus body 101, serial communication can be performed between the microcomputer 110 on the side of the imaging apparatus body 101 and the microcomputer 150 on the side of the battery pack 102. That is, information can be mutually exchanged between the imaging apparatus body 101 and the battery pack 102. Therefore, even when a different type of battery pack is mounted on the imaging apparatus body 101, the imaging apparatus body 101 can understand the model of the battery, the specifications of the battery, and the residual amount of the battery. The battery pack 102 may be built in the imaging apparatus 100.

In addition, the microcomputer 150 measures the potential difference of a current sensing resistor, and calculates current which flows into the battery cell 170 and current which flows from the battery cell 170 at a predetermined frequency. Thereafter, the microcomputer 150 calculates the amount of current of the battery, which can be currently used, by accumulating the amount of current, and outputs the result of the calculation to the microcomputer 110.

Example of Functional Configuration of Imaging Apparatus

Figure 3:
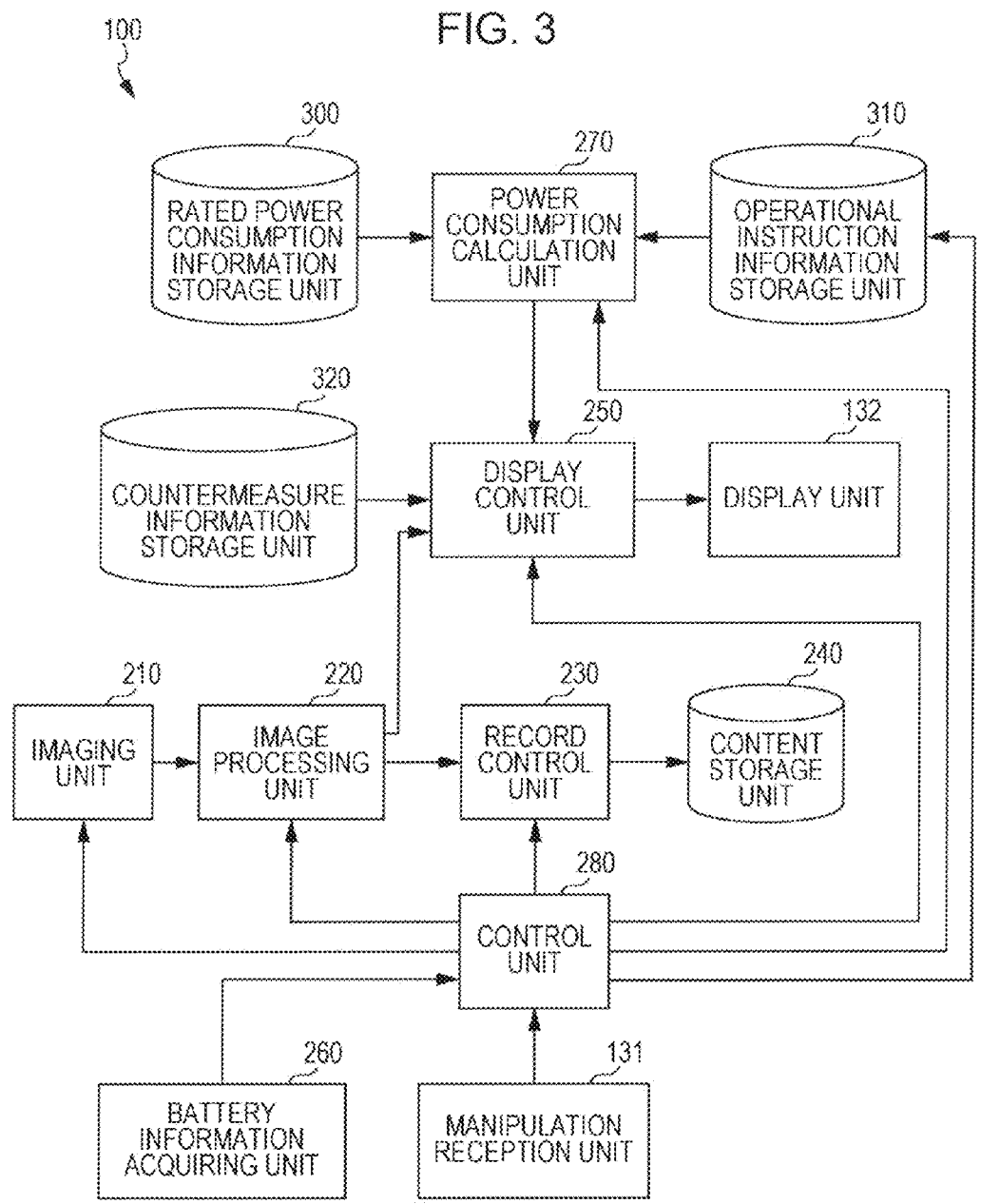
FIG. 3 is a block diagram illustrating an example of the functional configuration of the imaging apparatus according to the first embodiment of the present technology.

FIG. 3 is a block diagram illustrating an example of the functional configuration of the imaging apparatus 100 according to the first embodiment of the present technology.

The imaging apparatus 100 includes a manipulation reception unit 131, a display unit 132, and an imaging unit 210, an image processing unit 220, a record control unit 230, a content storage unit 240, a display control unit 250, a battery information acquiring unit 260, a power consumption calculation unit 270, and a control unit 280. In addition, the imaging apparatus 100 includes a rated power consumption information storage unit 300, an operational instruction information storage unit 310, and a countermeasure information storage unit 320.

The manipulation reception unit 131 and the display unit 132 correspond to the manipulation reception unit 131 and the display unit 132 of the same reference numerals shown in FIG. 2. In addition, the imaging unit 210 and the image processing unit 220 correspond to the imaging processing unit 140 shown in FIG. 2. In addition, the record control unit 230, the display control unit 250, the battery information acquiring unit 260, the power consumption calculation unit 270, and the control unit 280 correspond to the microcomputer 110 shown in FIG. 2. In addition, the content storage unit 240, the rated power consumption information storage unit 300, the operational instruction information storage unit 310, and the countermeasure information storage unit 320 correspond to the nonvolatile memory 120 shown in FIG. 2.

The manipulation reception unit 131 receives manipulation performed by the user, and outputs a control signal (manipulation signal) in response to the content of the received manipulation to the control unit 280.

The display unit 132 is a display panel which displays each image based on the control of the display control unit 250.

The rated power consumption information storage unit 300 stores information (rated power consumption information) related to the power consumption of each function of the imaging apparatus 100, and supplies the rated power consumption information, which is being stored, to the power consumption calculation unit 270. Content stored in the rated power consumption information storage unit 300 will be described in detail with reference to FIG. 4.

The operational instruction information storage unit 310 stores the history of the value of an instruction related to each function of the imaging apparatus 100 (operational instruction history information), and supplies the stored operational instruction history information to the power consumption calculation unit 270. Content stored in the operational instruction information storage unit 310 will be described in detail with reference to FIG. 5.

The countermeasure information storage unit 320 stores an available countermeasure (countermeasure information) used to control power consumption related to each function of the imaging apparatus 100, and supplies the stored countermeasure information to the display control unit 250. Content stored in the countermeasure information storage unit 320 will be described in detail with reference to FIG. 7.

The imaging unit 210 generates an image signal (analog signal) based on the instructions of the control unit 280, and outputs the generated image signal to the image processing unit 220. In detail, the imaging unit 210 includes an imaging element (not shown) which converts object light which is incident through an optical system (not shown) into an electric signal, and an analog signal processing unit (not shown) which processes the output signal (analog signal) of the imaging element. That is, the optical image of the object which is incident through the optical system is formed on the imaging surface of the imaging element, and the imaging element performs an imaging operation in this state, thus the analog signal is generated in the imaging unit 210. Further, the analog signal processing unit performs analog processing, such as noise rejection or amplification, on the analog signal, thus an image signal is generated. Further, the generated image signal (analog signal) is output to the image processing unit 220. For example, a charge coupled device (CCD) or a complementary metal oxide semiconductor (CMOS) can be used as the imaging element.

In addition, the optical system includes a lens group which concentrates light which is incident from the object or aperture, and light concentrated using the lens group is incident to the imaging element of the imaging unit 210 via the aperture. In addition, the lens group includes a focus lens used to bring into focus or a zoom lens used to enlarge the object. In addition, each lens included in the optical system is driven based on the instruction of the control unit 280 and is moved back and forth with regard to the object, thus a focusing function and a zoom function are implemented. In addition, when a camera shaking correction function is turned on, the imaging unit 210 performs a camera shaking correction process.

The image processing unit 220 converts the image signal (analog signal) output from the imaging unit 210 into a digital signal, and performs various types of image processes on the image signal (digital signal) generated through the conversion based on the instruction of the control unit 280. Further, the image processing unit 220 outputs the image signal (image data) on which various types of image processes are performed to the record control unit 230 and the display control unit 250.

The record control unit 230 controls recording performed on the content storage unit 240 based on the instruction of the control unit 280. For example, the record control unit 230 records the image (image data) output from the image processing unit 220 in the content storage unit 240 as image content (a still image file or a video file).

The content storage unit 240 is a recording medium which stores various types of information (image content) based on the control performed using the record control unit 230. The content storage unit 240 may be built in the imaging apparatus 100 and may be detachable from the imaging apparatus 100.

The display control unit 250 causes the display unit 132 to display the image output from the image processing unit 220 based on the instruction of the control unit 280. For example, the display control unit 250 displays the display screens (for example, the display screens shown in FIGS. 9 to 11), which are used to perform various types of manipulations related to the imaging operation, or images (so-called through-the-lens images) generated using the imaging unit 210 on the display unit 132.

The battery information acquiring unit 260 acquires the battery information (for example, the battery voltage of the battery cell 170) of the battery pack 102 from the battery pack 102, and outputs the acquired battery information to the control unit 280.

The power consumption calculation unit 270 calculates power consumptions related to a plurality of functions during a predetermined period for the respective functions based on the instruction of the control unit 280, and outputs the calculated power consumptions related to the respective functions to the display control unit 250. In addition, the power consumption calculation unit 270 calculates power consumptions for the respective functions during a plurality of periods (for example, 3 hours, half a day, and a single day) as the predetermined period for the respective periods. In detail, the power consumption calculation unit 270 calculates operation times related to the plurality of functions during the predetermined period for the respective functions based on the content stored in the operational instruction information storage unit 310. Further, the power consumption calculation unit 270 calculates power consumptions related to the plurality of functions during the predetermined period for the respective functions based on the calculated operation times of the respective functions and the content stored in the rated power consumption information storage unit 300. A method of calculating the power consumptions related to the respective functions will be described in detail with reference to FIGS. 6A and 6B. In addition, the power consumption calculation unit 270 is an example of a calculation unit in the present disclosure.

The control unit 280 controls each unit of the imaging apparatus 100 based on a control program stored in a memory (not shown). In addition, the control unit 280 sequentially records the history of the value of an instruction related to a function used to give the instruction (operational instruction history information) in the operational instruction information storage unit 310.

Figure 10:
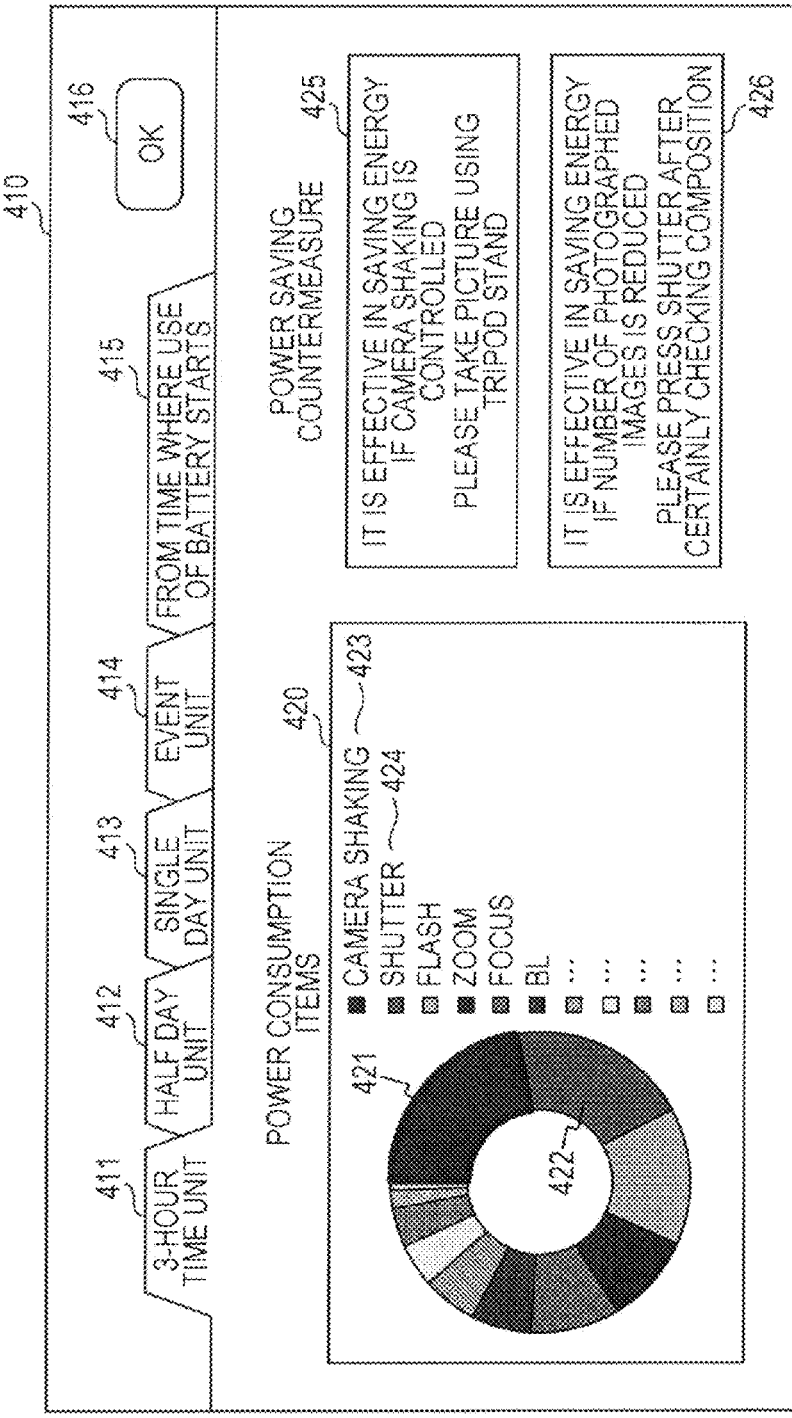
FIG. 10 is a view illustrating an example of an energy saving encourage screen which is displayed on the display unit according to the first embodiment of the present technology.

For example, the control unit 280 performs control to display the power consumptions for the respective functions, which are calculated using the power consumption calculation unit 270, and the countermeasures, which are used to control the power consumptions related to a predetermined number of functions of the plurality of functions, on the display unit 132. For example, the control unit 280 causes the energy saving encouragement screen 410 to be displayed on the display unit 132 as shown in FIG. 10. In this case, the control unit 280 performs control to display countermeasures, related to functions which satisfy a predetermined condition among the plurality of functions, on the display unit 132. That is, the control unit 280 determines one or more functions, having power consumptions which are calculated using the power consumption calculation unit 270 and which are greater than a predetermined value used as a reference, as functions which satisfy the predetermined condition, and performs control to display countermeasures related to the functions which satisfy the predetermined condition on the display unit 132.

The plurality of functions can be stopped or modified by the manipulation of the user. For example, the functions can be turned on or turned off by the manipulation of the user, and the use thereof can be reduced by the manipulation of the user.

In addition, the control unit 280 performs control to identifiably display the power consumptions calculated using the power consumption calculation unit 270 on the display unit 132 for the respective functions as shown in a power consumption item display region 420 in FIG. 10. In addition, the control unit 280 performs control to display the power consumptions for the respective functions which are calculated during a period selected by the manipulation of the user from among the plurality of periods (for example, 3 hours, half a day, and a single day) on the display unit 132.

In addition, when the residual amount of the battery which is built in or mounted on the imaging apparatus 100 is less than a predetermined value used as a reference, the control unit 280 performs control to display the power consumptions for the respective functions and the countermeasures related to the predetermined number of functions on the display unit 132. In detail, when the residual amount of the battery is less than the predetermined value used as the reference, the control unit 280 performs control to display a manipulation screen (for example, a residual battery amount notification screen 400 shown in FIG. 9), which is used to perform either a first manipulation or a second manipulation, on the display unit 132. Here, the first manipulation is a manipulation used to display the power consumptions for the respective functions and the countermeasures for the predetermined number of functions on the display unit 132, and corresponds to, for example, a manipulation of pressing a "go to energy saving encourage screen" button 403 shown in FIG. 9. In addition, the second manipulation is a manipulation used to set a specific mode used to automatically control the power consumptions related to one or more functions, and corresponds to, for example, a manipulation of pressing a "change into energy saving mode" button 404 shown in FIG. 9.

In addition, after the power consumptions for the respective functions and the countermeasures for the predetermined number of functions are displayed on the display unit 132, the control unit 280 performs control to display a menu screen for selecting a desired function to be stopped among the plurality of functions, on the display unit 132. The menu screen is, for example, a menu screen for selecting function to be stopped 430 (hereinafter referred to as a menu screen 430) shown in FIG. 11A. In this case, the control unit 280 performs control to display the menu screen on the display unit 132 such that a manipulation region for selecting the predetermined number of functions to be stopped is displayed in a different way from that of another manipulation region for indicating functions not to be stopped (for example, differently colored).

Example of Content of Rated Power Consumption Information Storage Unit

FIG. 4 is a view illustrating an example of content stored in the rated power consumption information storage unit 300 according to the first embodiment of the present technology.

The rated power consumption information storage unit 300 stores information (rated power consumption information) related to the power consumptions related to the respective functions of the imaging apparatus 100. A function 301 and a rated power consumption 302 are associated with and stored in the rated power consumption information storage unit 300.

The function 301 indicates respective functions of the imaging apparatus 100. In the first embodiment of the present technology, still image record, video record, zoom control, focus control, camera shaking correction, and flash control are shown as examples of the respective functions of the imaging apparatus 100. The functions are examples, and the embodiment of the present disclosure may be applied to functions other than the functions shown in FIG. 4.

The rated power consumption 302 indicates rated power consumptions related to the respective functions of the imaging apparatus 100 (that is, power consumptions per unit time). In FIG. 4, for ease of the explanation, the respective rated power consumptions (the power consumptions per unit time) are abbreviated and shown as W1, W2, W3, W4, W5, or W6 (mW).

Example of Content Stored in Operational Instruction Information Storage Unit

FIG. 5 is a view schematically illustrating an example of content stored in the operational instruction information storage unit 310 according to the first embodiment of the present technology.

The operational instruction information storage unit 310 stores the history of an instruction value related to each function (operational instruction history information) of the imaging apparatus 100. A function 311 and operational instruction history information 312 are associated with and stored in the operational instruction information storage unit 310.

The function 311 indicates the respective functions of the imaging apparatus 100. The function 311 corresponds to the function 301 shown in FIG. 4.

The operational instruction history information 312 indicates the history information of an instruction value related to each function of the imaging apparatus 100. In FIG. 5, for easy of the explanation, the history information of the instruction value during a predetermined period is shown using "0" or "1" along a time axis in the horizontal direction. That is, "0" means that an instruction is not given in a time slot, and "1" means that an instruction is given in the time slot. In addition, based on the data of the operational instruction history information 312, it is possible to estimate a time expended for a function during a predetermined period. An example of the estimation is shown in FIG. 6A.

Example of Calculation of Operation Times of Respective Functions and Power Consumptions of Respective Functions FIGS. 6A and 6B are simplified views illustrating examples of the operation times of the respective functions and the power consumptions of the respective functions which are calculated using the power consumption calculation unit 270 according to the first embodiment of the present technology.

FIG. 6A illustrates an example of the operation time of each function calculated using the power consumption calculation unit 270. That is, FIG. 6A illustrates the relationship between each function and an estimated operation time by associating a function 315 with an operation time 316.

As described above, the power consumption calculation unit 270 can calculate (estimate) the operation times of the respective functions based on content stored in the operational instruction information storage unit 310. In detail, the operation times of the respective functions can be calculated (estimated) by totalizing the periods during which the operational instruction history information 312 of the operational instruction information storage unit 310 is "1" for the respective functions. For ease of the explanation, in FIG. 6A, the respective operation times are abbreviated and shown as T1, T2, T3, T4, T5, and T6 (min).

FIG. 6B illustrates an example of the power consumptions of the respective functions calculated using the power consumption calculation unit 270. That is, FIG. 6B illustrates the relationship between the respective functions and actual power consumptions by associating a function 317 and a power consumption 318.

Here, the power consumption calculation unit 270 can calculate the power consumptions of the respective functions based on the calculated operation times of the respective functions (shown in FIG. 6A) and the content stored in the rated power consumption information storage unit 300. In detail, the power consumption calculation unit 270 can calculate the power consumptions of the respective functions by multiplying the operation times Tn (n is an integer number which is equal to or greater than 1) of the respective functions shown in FIG. 6A by the rated power consumptions Wn (n is an integer number which is equal to or greater than 1) of the respective functions shown in FIG. 4. For ease of the explanation, in FIG. 6B, the power consumptions per unit time of the respective functions are abbreviated and shown as W11, W22, W33, W44, W55, and W66 (mW).

Example of Content Stored in Countermeasure Information Storage Unit

FIG. 7 is a view schematically illustrating an example of content stored in the countermeasure information storage unit 320 according to the first embodiment of the present technology.

The countermeasure information storage unit 320 stores available countermeasures (countermeasure information) used to control the power consumptions of the respective functions of the imaging apparatus 100. A function 321 and countermeasure information 322 are associated with and stored in the countermeasure information storage unit 320.

The function 321 indicates the respective functions of the imaging apparatus 100. The function 321 corresponds to the function 301 shown in FIG. 4.

The countermeasure information 322 indicates available countermeasures (countermeasure information) used to control the power consumptions of the respective functions of the imaging apparatus 100. Although, for ease of the explanation, a single available countermeasure is shown for a single function in FIG. 7, a plurality of available countermeasures may be associated with a single function and stored. In addition, content of the countermeasure information 322 is displayed on the display unit 132 such that the content of the countermeasure information 322 is shown in energy saving countermeasure display regions 425 and 426 of FIG. 10.

Example of Detection of Residual Amount of Battery

Figure 8:
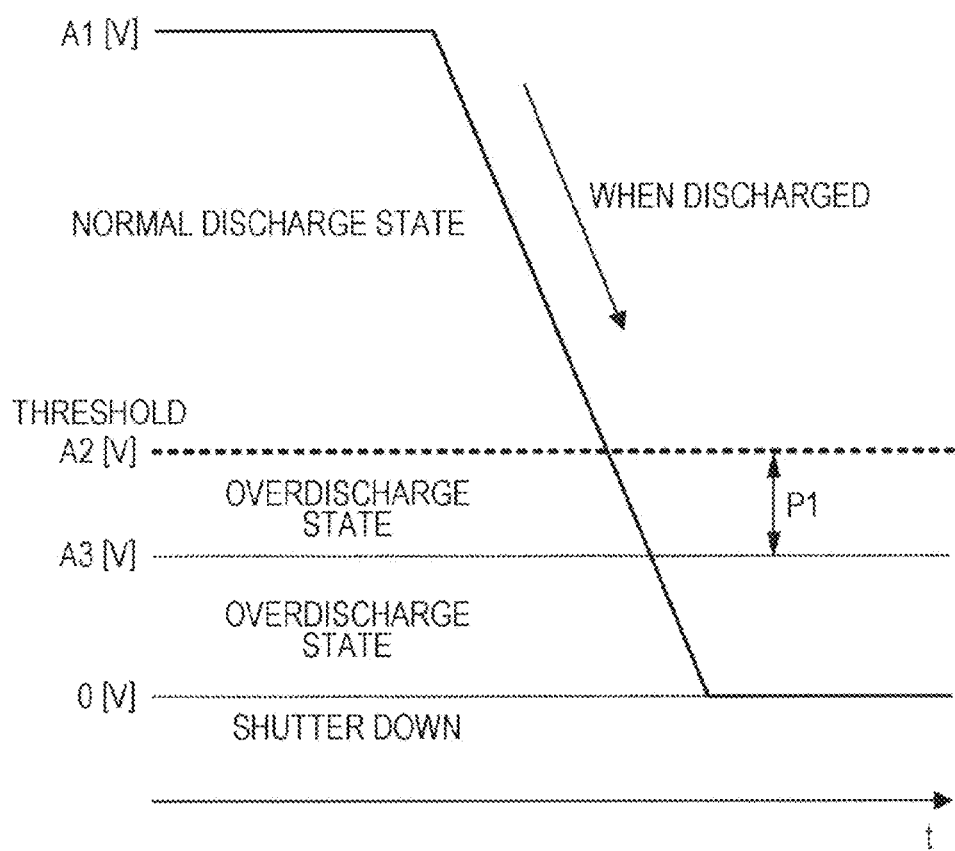
FIG. 8 is a simplified view illustrating the transition of the residual amount of a battery, which is acquired using a battery information acquiring unit according to the first embodiment of the present technology.

FIG. 8 is a simplified view illustrating the transition of the residual amount of the battery which is acquired using the battery information acquiring unit 260 according to the first embodiment of the present technology. In FIG. 8, a horizontal axis is a time axis and a longitudinal axis is an axis which indicates the value of a battery voltage.

In FIG. 8, a battery voltage is indicated as A1 [V] when the battery cell 170 is fully charged, and the threshold of a preset battery voltage is indicated as A2 [V].

The control unit 280 senses the battery voltage acquired using the battery information acquiring unit 260 at a predetermined interval. Further, when the control unit 280 detects that the battery voltage acquired using the battery information acquiring unit 260 is equal to or lower than the threshold A2 [V], the control unit 280 performs control such that the control unit 280 notifies the user that the residual amount of the battery is low. An example of the notification will be described in detail with reference to FIG. 9.

Here, the control unit 280 may notify the user that the residual amount of the battery is low when the battery voltage acquired using the battery information acquiring unit 260 is present in a predetermined range P1 (between the thresholds A2 [V] and A3 [V]) ranging from the threshold A2 [V] to 0 [V]. For example, when the battery voltage acquired using the battery information acquiring unit 260 is present in the predetermined range P1, the control unit 280 can periodically or randomly notify the user that the residual amount of the battery is low until a predetermined manipulation (for example, a notification stop manipulation) is performed.

The first embodiment of the present technology shows the example in which the microcomputer 110 (control unit 280) of the imaging apparatus body 101 determines whether the battery voltage is equal to or lower than the threshold A2 [V]. However, the microcomputer 150 of the battery pack 102 may determine whether the battery voltage is equal to or lower than the threshold A2 [V]. In this case, when the battery voltage is equal to or lower than the threshold A2 [V], the microcomputer 150 of the battery pack 102 notifies the microcomputer 110 of the imaging apparatus body 101 that the battery voltage is equal to or lower than the threshold A2 [V]. Further, the microcomputer 110 (control unit 280) of the imaging apparatus body 101 performs control such that the microcomputer 110 notifies the user that the above-described residual amount of the battery is low based on the notification.

Example of Display of Battery Residual Amount Notification Screen

Figure 9:
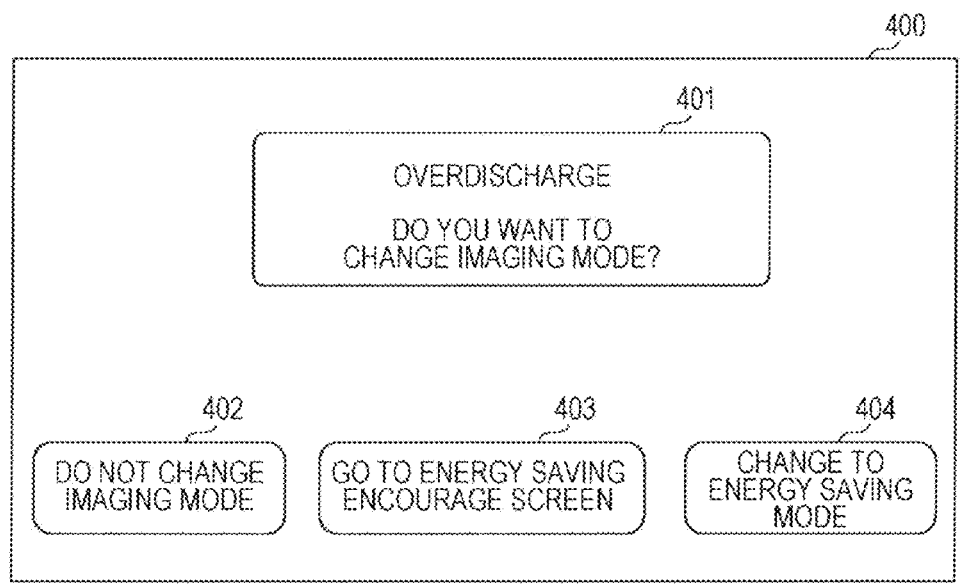
FIG. 9 is a view illustrating an example of a battery residual amount notification screen which is displayed on a display unit according to the first embodiment of the present technology.

FIG. 9 is a view illustrating an example of a battery residual amount notification screen (battery residual amount notification screen 400) which is displayed on the display unit 132 according to the first embodiment of the present technology.

The residual battery amount notification screen 400 is a screen used to notify the user that the residual amount of the battery is low when the battery voltage acquired using the battery information acquiring unit 260 is equal to or lower than the threshold A2 [V]. The residual battery amount notification screen 400 includes a message display region 401, a "do not change imaging mode" button 402, a "go to energy saving encourage screen" button 403, and a "change to energy saving mode" button 404.

In the message display region 401, the facts that the residual amount of the battery is low and that a desired button is pressed are displayed.

The "do not change imaging mode" button 402 is a button which is pressed when a set imaging mode is not caused to be changed. That is, the "do not change imaging mode" button 402 is pressed when the user continuously uses the imaging apparatus 100 without changing the imaging mode even though the residual amount of the battery is low. For example, when the user prepares an auxiliary battery pack, the currently mounted battery cell 170 of the battery pack 102 may not be used. Therefore, the imaging apparatus 100 can be continuously used without changing the imaging mode.

The "go to energy saving encourage screen" button 403 is a button which is pressed when the energy saving encourage screen is caused to be displayed. The energy saving encourage screen will be described in detail with reference to FIG. 10.

The "change to energy saving mode" button 404 is a button which is pressed when an energy saving mode is set by changing the set imaging mode. The energy saving mode is an imaging mode used to control power consumptions by stopping predetermined functions of the plurality of functions of the imaging apparatus 100. The energy saving mode will be described in detail with reference to FIG. 12.

As described above, when the battery voltage acquired using the battery information acquiring unit 260 is equal to or lower than the threshold A2 [V], the display control unit 250 causes the battery residual amount notification screen 400 to be displayed on the display unit 132 based on the instruction of the control unit 280. As described above, the selection, for example, whether to continue to photograph as it is without changing the imaging mode, whether to progress to the energy saving encourage screen, or whether to change into the energy saving mode may be promoted by causing the residual battery amount notification screen 400 to be displayed.

For example, when the "do not change imaging mode" button 402 is pressed in the residual battery amount notification screen 400, the photographing performed up to now is continued until the residual amount of the battery ends. In addition, when the "go to energy saving encourage screen" button 403 is pressed, the energy saving encourage screen 410 shown in FIG. 10 is displayed. Therefore, the power consumptions of the respective functions or the countermeasures used to reduce the power consumptions of the respective functions can be seen. In addition, when the "change to energy saving mode" button 404 is pressed, the energy saving mode is set and a predetermined function stop process is automatically performed.

Example of Display of Energy Saving Encourage Screen

FIG. 10 is a view illustrating an example of an energy saving encourage screen (the energy saving encourage screen 410) which is displayed on the display unit 132 according to the first embodiment of the present technology.

The energy saving encourage screen 410 is a screen which is displayed after the "go to energy saving encourage screen" button 403 is pressed in the residual battery amount notification screen 400 shown in FIG. 9. In the energy saving encourage screen 410, period tabs 411 to 415, an OK button 416, a power consumption item display region 420, and energy saving countermeasure display regions 425 and 426 are provided.

The period tabs 411 to 415 are tabs which are used to select a period when power consumption items displayed in the power consumption item display region 420 are calculated. FIG. 10 shows an example in which a "3-hour time unit" tab 411, a "half day unit" tab 412, a "single day unit" tab 413, an "event unit" tab 414, and a "from time where the use of battery starts" tab 415 are provided as the period tabs 411 to 415.

The "3-hour time unit" tab 411 is a tab which is used to display power consumption items, acquired until before 3 hours from the present, in the power consumption item display region 420.

The "half day unit" tab 412 is a tab which is used to display power consumption items, acquired during a half day including the present (from 0 a.m. until noon or from noon to 12 p.m. (24 O'clock)) in the power consumption item display region 420.

The "single day unit" tab 413 is a tab which is used to display power consumption items, acquired during a single day including the present (from 0 a.m. to 12 p.m. (24 O'clock)) in the power consumption item display region 420.

The "event unit" tab 414 is a tab which is used to display the power consumption items of events including the present in the power consumption item display region 420. Meanwhile, such an event means a predetermined period, for example, a school athletics meeting or travel, during which multiple imaging operations are continuously or intermittently performed. For example, when a period from when power is turned off to when the power is turned on is included within the predetermined time (for example, within 3 hours), a previous imaging operation period and a present imaging operation period can be regarded as the same event. In addition, for example, three or more imaging operation periods, during which the period from when power is turned off to when subsequent power is turned on is included within the predetermined time, can be regarded as the same event.

The "from time where the use of battery starts" tab 415 is a tab which is used to display power consumption items, acquired from when the use of the currently mounted battery pack 102 starts (or when the charge of the battery ends), in the power consumption item display region 420.

FIG. 10 shows a state in which the "3-hour time unit" tab 411 is selected. In addition, the period, during which the power consumption items displayed in the power consumption item display region 420 are calculated, is not limited to the above-described periods (3 hours, a half day, and a single day), and other periods may be used.

Figure 11A:
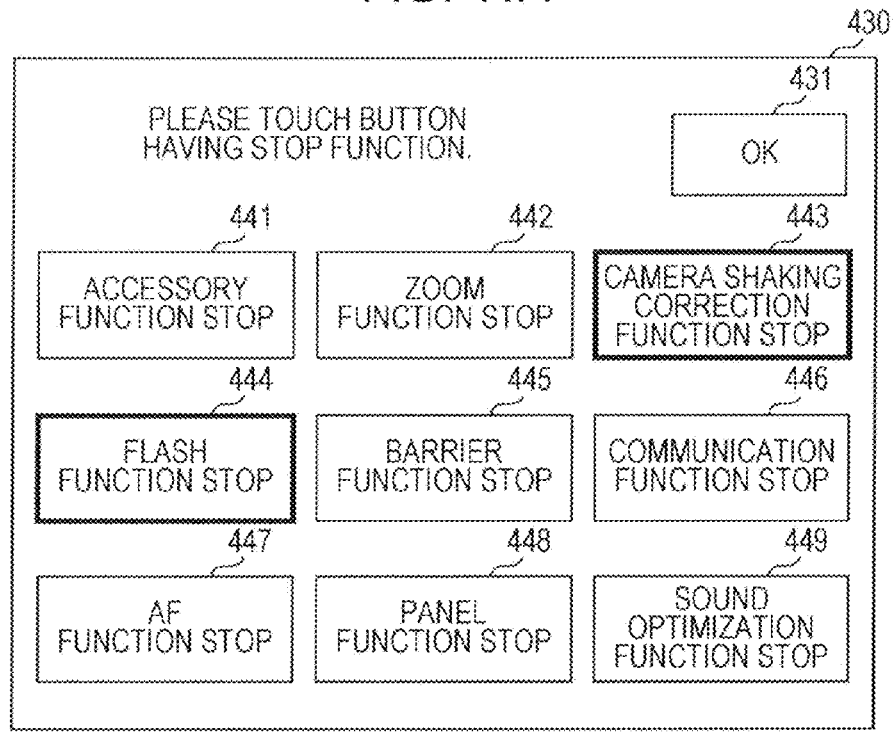
FIGS. 11A and 11B are views illustrating examples of a menu screen for selecting function to be stopped and an imaging operation screen which are displayed on the display unit according to the first embodiment of the present technology.

The OK button 416 is a button which is pressed after content displayed on the energy saving encourage screen 410 is checked. When the OK button 416 is pressed, the menu screen 430 shown in FIG. 11A is displayed.

The power consumption item display region 420 is a region which is used to display the power consumptions calculated using the power consumption calculation unit 270 such that the power consumptions can be identified for the respective functions. FIG. 10 shows an example in which the power consumptions are displayed for the respective functions using a doughnut-shaped circular graph. For example, in the circular graph, the percentages of the power consumptions of the respective functions are displayed in such a way that the power consumptions are distinguished using color in order from the highest power consumption from the location of 12 O'clock of a clock in the clockwise direction. In addition, on the right of the circular graph in the power consumption item display region 420, the names of the respective functions are displayed in order from the highest power consumption from the top. The color of the rectangle on the left of the name of each function is the same as the color of a region corresponding to each function in the circular graph in the case of the same function.

For example, it is assumed that a function having the highest power consumption of the power consumptions calculated using the power consumption calculation unit 270 is the camera shaking correction and a function having the second highest power consumption is the still image record (shutter). In this case, in the circular graph, a sector region 421 corresponding to the function having the highest power consumption, that is, "camera shaking" is displayed in the clockwise direction from the location of 12 o'clock of a clock. In addition, a sector region 422 corresponding to the function having the second highest power consumption, that is, "shutter" is displayed to be adjacent to the sector region 421 in the clockwise direction.

In addition, on the right of the circular graph in the power consumption item display region 420, functions are displayed in order of the function "camera shaking" 423 having the highest power consumption and the function "shutter" 424 having the second highest power consumption from the top.

Although FIG. 10 shows an example in which the power consumptions related to the respective functions are displayed using the circular graph, the power consumptions related to the respective functions may be displayed using other display states. For example, the power consumptions related to the respective functions can be displayed using a bar graph, a cylindrical graph, or numerical values.

The energy saving countermeasure display regions 425 and 426 are regions which are used to display energy saving countermeasures related to one or more functions having comparatively high power consumptions among the power consumptions calculated using the power consumption calculation unit 270. FIG. 10 shows an example in which energy saving countermeasures related to two functions having high power consumptions are displayed. That is, an energy saving countermeasure related to the function "camera shaking" having the highest power consumption is displayed in the energy saving countermeasure display region 425 and an energy saving countermeasure related to the function "shutter" having the second highest power consumption is displayed in the energy saving countermeasure display region 426. The display control unit 250 displays these energy saving countermeasures on the display unit 132 based on the content stored in the countermeasure information storage unit 320.

As described above, the user can display a way of continuing the imaging operation during the predetermined period (for example, in 3-hour unit or a half day unit) and an energy saving countermeasure corresponding thereto on the energy saving encourage screen 410. In addition, the user can easily know a method of effectively using the residual amount of the battery by displaying the energy saving encourage screen 410.

For example, it is assumed that the energy saving encourage screen 410 is displayed on the display unit 132 in the state in which the user 10 performs a video imaging operation while holding the imaging apparatus 100 in a hand as shown in FIG. 1A. In this case, when the user 10 watches the energy saving countermeasure display region 425 of the energy saving encourage screen 410, the user can perform the video imaging operation in the state in which the imaging apparatus 100 is fixed to the tripod stand 20 as shown in FIG. 1B. As described above, the operation of the camera shaking correction function can be reduced and the power consumption can be reduced by performing the video imaging operation in the state in which the imaging apparatus 100 is fixed to the tripod stand 20. Therefore, even when the imaging operation, such as a school athletics meeting, is continuously performed during a long time, battery exhaustion can be prevented.

Example of Display of Energy Saving Encourage Screen

Figure 11B:
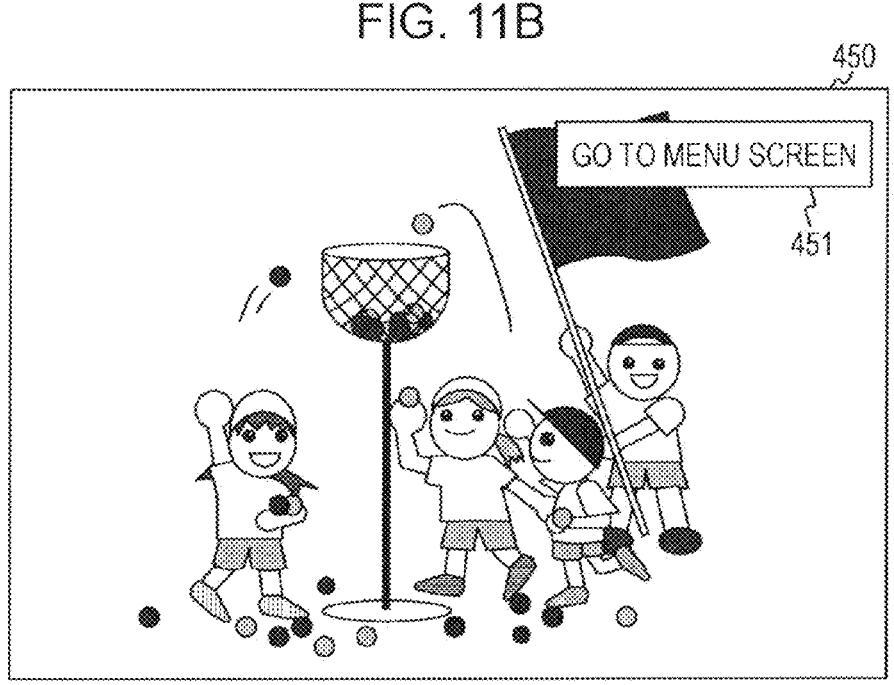

FIGS. 11A and 11B are views illustrating examples of a menu screen and an imaging operation screen (the menu screen 430 and the imaging operation screen 450) which are displayed on the display unit 132 according to the first embodiment of the present technology.

The menu screen 430 shown in FIG. 11A is a screen which is displayed after the OK button 416 is pressed on the energy saving encourage screen 410 shown in FIG. 10, and a screen which is used to select the on and off of the respective functions. An OK button 431 and stop target function buttons 441 to 449 are provided on the menu screen 430.

The OK button 431 is a button which is pressed after a desired button is pressed among the stop target function buttons 441 to 449 which are displayed on the menu screen 430. When the OK button 431 is pressed, a normal screen (for example, the imaging operation screen 450 shown in FIG. 11B) is displayed. In addition, when the OK button 431 is pressed, the control unit 280 performs a stop process of stopping a function corresponding to the pressed button (one of the stop target function buttons 441 to 449).

The stop target function buttons 441 to 449 are buttons which are used to select on and off of the respective functions. FIG. 11A shows an example in which a function which can be selected as a stop target is determined using a function other than a function related to a recording process (for example, a still image recording process or a video recording process). Therefore, in the power consumption item display region 420 shown in FIG. 10, the stop target function button related to the function "shutter (still image recording)" having the second highest power consumption is not displayed.

In addition, the function which can be selected as a stop target includes for example, an accessory correspondence function, a zoom function, a camera shaking correction function, a flash function, a barrier function, a communication-related function, an auto focus (AF) function, a panel brightness reducing function, and a sound optimization function. In addition, the stop target function buttons 441 to 449 corresponding thereto are displayed. The accessory correspondence function means a function used to correspond to an external apparatus which is attached to the imaging apparatus 100. For example, when the accessory correspondence function stops, communication with the external apparatus which is attached to the imaging apparatus 100 is turned off.

The barrier function means a function which is used to automatically open and shut a lens cover. In addition, when the barrier function stops, the automatic opening and shutting of the lens cover stops, thus the lens cover is left open.

In addition, a button which corresponds to one or more functions having comparatively high power consumption from among the stop target function buttons 441 to 449 may be displayed such that the button can be distinguished from other buttons. For example, the color of the button which corresponds to one or more functions having comparatively high power consumption can be different from the colors of other buttons.

For example, in the power consumption item display region 420 shown in FIG. 10, the function having the highest power consumption is "camera shaking correction", and function having the third highest power consumption is "flash". In this case, the color of the stop target function button 443 which corresponds to the function having the highest power consumption "camera shaking correction" and the color of the stop target function button 444 which corresponds to the function having the third highest power consumption "flash" can be different from the colors of other buttons. FIG. 11A shows an example in which the outlines of rectangles corresponding to the stop target function buttons 443 and 444 are thick, thereby distinguishing from other buttons. In this example, the buttons are distinguishably displayed by coloring or by using thick lines and narrow lines. However, other display states can be used if the buttons can be distinguishably displayed.

As described above, when the stop target function buttons of comparatively high power consumptions and other buttons are displayed such that the buttons can be distinguished from each other and when the user determines whether to turn on or off a function, the determination can be easily performed.

In addition, it is possible to easily select only a function by which the user considers that the function may be stopped for a short time (a period until the residual amount of the battery is run down) by displaying the menu screen 430. Therefore, it is possible to smoothly perform the remaining imaging operation while effectively using the residual amount of the battery.

The imaging operation screen 450 shown in FIG. 11B is a screen which is displayed after the ok button 431 of the menu screen 430 shown in FIG. 11A is pressed, and an example of a screen which is displayed when a normal imaging operation is performed. The imaging operation screen 450 is provided with a "go to menu screen" button 451. In the other regions of the imaging operation screen 450, for example, other images (for example, a through images shown in FIG. 11B) which are displayed when the imaging operation is performed is displayed.

The "go to menu screen" button 451 is a button which is pressed when the menu screen 430 shown in FIG. 11A is displayed. That is, when the "go to menu screen" button 451 is pressed, the menu screen 430 shown in FIG. 11A is displayed.

As described above, even in a state in which the imaging operation is performed after a stop function selection manipulation is performed on the menu screen 430 shown in FIG. 11A, the stop function selection manipulation can be performed again by pressing the "go to menu screen" button 451. That is, it is possible to have flexibility which causes the stop function selection manipulation to be performed again at a desired timing for a user by providing the "go to menu screen" button 451 on the imaging operation screen 450.

Example of Operation of Imaging Apparatus

Figure 12:
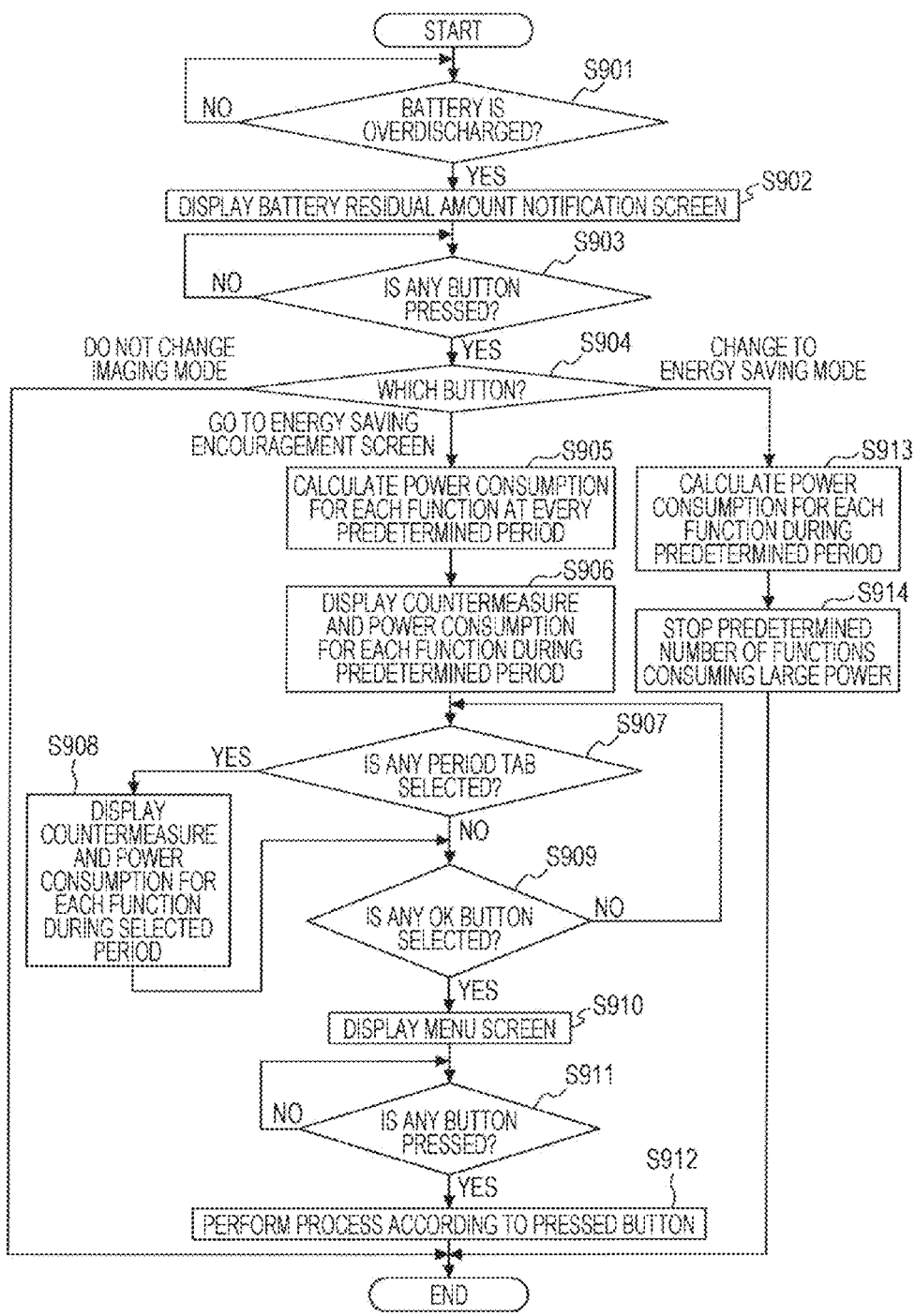
FIG. 12 is a flowchart illustrating an example of the processing procedure of a display process performed using the imaging apparatus according to the first embodiment of the present technology.

FIG. 12 is a flowchart illustrating an example of the processing procedure of a display process performed using the imaging apparatus 100 according to the first embodiment of the present technology.

Initially, the control unit 280 determines whether the battery voltage acquired using the battery information acquiring unit 260 is equal to or lower than the threshold A2 [V] in step S901. When the battery voltage is not equal to or lower than the threshold A2 [V], the control unit 280 continuously performs observation. Meanwhile, when the battery voltage is equal to or lower than the threshold A2 [V] in step S901, the display control unit 250 displays the residual battery amount notification screen 400 (shown in FIG. 9) on the display unit 132 based on the instruction of the control unit 280 in step S902.

Continuously, the control unit 280 determines whether a button pressing manipulation is performed on the residual battery amount notification screen 400 in step S903. When the button pressing manipulation is not performed, the control unit 280 continuously performs observation. Meanwhile, when the button pressing manipulation is performed in step S903, the control unit 280 determines a button on which the pressing manipulation is performed in step S904.

When a pressing manipulation is performed on the "do not change imaging mode" button 402 in step S904, a display processing operation is terminated because a function which is being currently set is continuously used.

In addition, when a pressing manipulation is performed on the "go to energy saving encourage screen" button 403 in step S904, the power consumption calculation unit 270 calculates the power consumptions related to the plurality of functions during the predetermined period for the respective functions based on the instruction of the control unit 280 in step S905. Continuously, the display control unit 250 displays the energy saving encourage screen 410 (shown in FIG. 10) on the display unit 132 based on the instruction of the control unit 280 in step S906. Step S905 and step S906 are examples of a calculation procedure and a display procedure of the present disclosure, respectively.

Subsequently, the control unit 280 determines whether a selection manipulation is performed on the period tab (the period tabs 411 to 415 shown in FIG. 10) in the energy saving encourage screen 410 in step S907. Further, when the selection manipulation is performed in step S907, the display control unit 250 displays the energy saving encourage screen 410, which includes the power consumptions calculated during a period corresponding to the selected period tab for the respective functions, on the display unit 132 in step S908.

When the selection manipulation is not performed in step S907, the control unit 280 determines whether the pressing manipulation is performed on the OK button 416 (shown in FIG. 10) in the energy saving encourage screen 410 in step S909. When the pressing manipulation is not performed in step S909, the process returns to step S907. Meanwhile, when the pressing manipulation is performed in step S909, the display control unit 250 displays the menu screen 430 (shown in FIG. 11) on the display unit 132 based on the instruction of the control unit 280 in step S910.

Continuously, the control unit 280 determines whether or not the button pressing manipulation is performed on the menu screen 430 in step S911. When the pressing manipulation is not performed in step S911, the control unit 280 continuously performs observation. Meanwhile, when the pressing manipulation is performed in step S911, the control unit 280 performs a process according to the pressed button in step S912, and terminates the operation of the display process. For example, when one or more stop target function buttons are pressed among the stop target function buttons 441 to 449 and the OK button 431 is pressed, the control unit 280 performs the stop process of stopping the functions corresponding to the pressed stop target function buttons.

In addition, when the pressing manipulation is performed on the "change to energy saving mode" button 404 in step S904, the power consumption calculation unit 270 calculates the power consumptions related to the plurality of functions during the predetermined period for the respective functions based on the instruction of the control unit 280 in step S913. Continuously, the control unit 280 sets a specific mode used to automatically reduce power consumptions related to one or more functions in which the power consumptions calculated using the power consumption calculation unit 270 are higher than the predetermined values used as references in step S914. When the specific mode is set, the stop process is performed on, for example, one or more functions in which the power consumptions calculated using the power consumption calculation unit 270 are greater than predetermined values used as references. However, as described above, only functions other than a function related to a specific function (for example, record process (a still image record process or a video record process)) are determined as the stop targets.

As described above, when the residual amount of the battery is less than a predetermined value used as a reference, the control unit 280 performs a control to set a specific mode used to automatically reduce power consumptions related to one or more functions having the power consumptions calculated using the power consumption calculation unit 270 which are greater than predetermined values used as references.

2. Modification

The first embodiment of the present technology illustrates an example in which an event (for example, the "event unit tab" 414 shown in FIG. 10), used as a reference when a power consumption related to each function is calculated, is set based on temporal information. However, an event may be set using information other than the temporal information.

Here, a modification illustrates an example in which an event is set using information other than the temporal information (for example, location information). The configuration of an imaging apparatus according to the modification is approximately the same as the example shown in FIGS. 2 and 3. Therefore, a part of the description of the portions which are common to the first embodiment of the present technology will be omitted.

The imaging apparatus 100 includes a location information acquiring unit (not shown). The location information acquiring unit acquires location information used to determine a location where the imaging apparatus 100 is present, outputs the acquired location information to the control unit 280. The location information acquiring unit can be implemented using, for example, a global positioning system (GPS) unit which calculates the location information based on a GPS signal received using a GPS signal reception antenna. The calculated location information includes each type of data related to a location, such as a latitude, a longitude, and an altitude, acquired when the GPS signal is received. In addition, a location information acquiring apparatus, which acquires the location information using another location information acquirement method, may be used. For example, a location information acquiring apparatus, which derives location information using access point information acquired by a peripheral wireless local area network (LAN) and acquires the location information, may be used.

In addition, the control unit 280 records the location information which is output from the location information acquiring unit in the operational instruction information storage unit 310 by associating the location information with the operational instruction history information 312. Further, the power consumption calculation unit 270 calculates power consumptions in units of an event based on content stored in the operational instruction information storage unit 310. The event means, for example, a predetermined period during which a plurality of imaging operations are continuously or intermittently performed in a predetermined range of location, such as a school athletic meeting or a travel. For example, a period, during which a location which is specified using the location information acquired using the location information acquiring unit is present in a predetermined range (for example, 3 km), can be regarded as the same event.

Here, it is assumed that a battery residual amount is displayed on the display unit 132 of the imaging apparatus 100 when the residual amount of the battery is low because, for example, pictures are taken for a long time. For example, it is assumed that an available time is acquired by dividing the residual amount of the battery by the power consumption per unit time and the available time is displayed, or it is assumed that a state in which the battery is fully charged is considered as 100%, and the residual amount of the battery corresponding thereto is displayed. For example, it is assumed that the residual amount of the battery is displayed using the length of a graphical bar.

However, in these display methods, it is assumed that it is difficult for the user to know the power consumption for a specific function. That is, there is a problem in that it is difficult to actually feel how the photographing style of the user affects the power consumption.

Here, in the embodiment of the present technology, when the residual amount of the battery is low because of long time photographing, in the imaging apparatus 100 having the plurality of functions, the power consumptions of which are different from each other, the power used for a function by the user is acquired through calculation based on the use history of the user. Further, the countermeasures used to reduce the high power consumptions related to the functions can be notified to the user, together with the acquired power consumption items. In addition, the user can easily know a method of effectively using the residual amount of the battery by watching the items and the countermeasures. In addition, since the user can select whether to turn on or off each function with reference to user's own photographing style, it is possible to find a further effective energy saving method. In addition, it is possible to automatically set the turning on or off of each function according to the user's photographing style.

In addition, even when, for example, the battery pack 102 is replaced with another battery pack, the battery residual amount can be corresponded by mounting a battery residual amount detection unit or a battery residual amount storage unit on the microcomputer 150 of the battery pack 102.

In the embodiment of the present technology, although the imaging apparatus 100 including the imaging unit 210 has been described as an example, the embodiment of the present technology can be applied to an imaging apparatus (electronic apparatus) from which the imaging unit can be detachable. In addition, the embodiment of the present technology can be applied to an electronic apparatus, such as an imaging function-attached mobile phone or an imaging function-attached mobile terminal apparatus.

The above-described embodiment is an example used to implement the present technology, and the items of the embodiment have the correspondence relationships with the specific items of the present technology described in the disclosure. In a similar way, the specific items of the present technology described in the disclosure have the correspondence relationships with the respective same named items of the embodiment of the present technology, to which the same names are attached. However, the present technology is not limited to the embodiment and can be implemented by modifying the embodiment in various types of manner without departing the gist of the present technology.

In addition, the processing procedure described in the above-described embodiment may be understood as a method which includes these series of procedures, and, in addition, may be understood as a program which is used to cause a computer to execute theses series of procedure and a recording medium which stores the program. As the recording medium, for example, a compact disc (CD), an MD (Mini-Disc), a digital versatile disk (DVD), a memory card, and a Blu-ray Disc (registered trademark) can be used.

The present technology may include the following configurations.

(1) An imaging apparatus includes a calculation unit that calculates power consumptions related to a plurality of functions during a predetermined period for the respective functions; and a control unit that performs control to display data of the calculated power consumptions for the respective functions and countermeasures to be used to reduce the power consumptions related to a predetermined number of functions among the plurality of functions, on a display unit.

(2) In the imaging apparatus of (1), the control unit performs control to display the countermeasures related to functions which satisfy a predetermined condition among the plurality of functions on the display unit.

(3) In the imaging apparatus of (2), the control unit employs one or more functions having the calculated power consumptions which are higher than a predetermined value used as a reference, as functions which satisfy the predetermined condition, and performs control to display the countermeasures related to the functions which satisfy the predetermined condition on the display unit.

(4) In the imaging apparatus of any one of (1) to (3), the control unit performs control to distinguishably display the calculated power consumptions for the respective functions on the display unit.

(5) In the imaging apparatus of any one of (1) to (4), when a residual amount of a battery which is built in or mounted on the imaging apparatus is lower than a predetermined value used as a reference, the control unit performs control to display the data of the power consumptions for the respective functions and the countermeasures related to the predetermined number of functions on the display unit.

(6) In the imaging apparatus of any one of (1) to (4), when a residual amount of a battery which is built in or mounted on the imaging apparatus is lower than a predetermined value used as a reference, the control unit performs control to display a manipulation screen on the display unit, on which either a first manipulation which displays the data of the power consumptions for the respective functions and the countermeasures related to the predetermined number of functions or a second manipulation which sets a specific mode to automatically reduce power consumptions related to one or more functions, on the display unit.

(7) In the imaging apparatus of any one of (1) to (6), the plurality of functions are capable of being stopped or changed by a manipulation of a user.

(8) In the imaging apparatus of any one of (1) to (7), after the data of the power consumptions for the respective functions and the countermeasures related to the predetermined number of functions are displayed on the display unit, the control unit performs control to display a menu screen on the display unit for selecting a desired function to be stopped among the plurality of functions.

(9) In the imaging apparatus of (8), the control unit performs control to display the menu screen on the display unit such that a manipulation region for selecting the predetermined number of functions to be stopped is displayed in a different way from that of another manipulation region for indicating functions not to be stopped.

(10) In the imaging apparatus of any one of (1) to (9), the calculation unit calculates the power consumptions for the respective functions during a plurality of periods as the predetermined periods for the respective periods, and the control unit performs control to display the power consumptions for the respective functions, which are calculated during a period selected by a manipulation of a user from among the plurality of periods, on the display unit.

(11) In the imaging apparatus of (1), when a residual amount of a battery which is built in or mounted on the imaging apparatus is lower than a predetermined value used as a reference, the control unit performs control to set a specific mode to automatically reduce power consumptions related to one or more functions having the calculated power consumptions which are greater than a predetermined value used as a reference.

(12) A method of controlling an imaging apparatus includes calculating power consumptions related to a plurality of functions during a predetermined period for the respective functions; and displaying data of the calculated power consumptions for the respective functions and countermeasures to be used to reduce the power consumptions related to a predetermined number of functions among the plurality of functions, on a display unit.

(13) A program causes a computer to calculate power consumptions related to a plurality of functions during a predetermined period for the respective functions; and display data of the calculated power consumptions for the respective functions and countermeasures to be used to reduce the power consumptions related to a predetermined number of functions among the plurality of functions, on a display unit.

The present disclosure contains subject matter related to that disclosed in Japanese Priority Patent Application JP 2011-261108 filed in the Japan Patent Office on Nov. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
a calculation unit that calculates power consumptions related to a plurality of functions during a predetermined period for the respective functions; and
a control unit that performs control to display data of the calculated power consumptions for the respective functions and countermeasures to be used to reduce the power consumptions related to a predetermined number of functions among the plurality of functions, on a display unit,
wherein the control unit performs control to display the countermeasures related to functions which satisfy a predetermined condition among the plurality of functions on the display unit, and
wherein the control unit employs one or more functions having the calculated power consumptions which are higher than a predetermined value used as a reference, as functions which satisfy the predetermined condition, and performs control to display the countermeasures related to the functions which satisfy the predetermined condition on the display unit.

2. The imaging apparatus according to claim 1,
wherein the control unit performs control to distinguishably display the calculated power consumptions for the respective functions on the display unit.

3. The imaging apparatus according to claim 1,
wherein, when a residual amount of a battery which is built in or mounted on the imaging apparatus is lower than a predetermined value used as a reference, the control unit performs control to display the data of the power consumptions for the respective functions and the countermeasures related to the predetermined number of functions on the display unit.

4. The imaging apparatus according to claim 1, wherein, when a residual amount of a battery which is built in or mounted on the imaging apparatus is lower than a predetermined value used as a reference, the control unit performs control to display a manipulation screen on the display unit, on which either a first manipulation which displays the data of the power consumptions for the respective functions and the countermeasures related to the predetermined number of functions or a second manipulation which sets a specific mode to automatically reduce power consumptions related to one or more functions, on the display unit.

5. The imaging apparatus according to claim 1, wherein the plurality of functions are capable of being stopped or changed by a manipulation of a user.

6. The imaging apparatus according to claim 1, wherein, after the data of the power consumptions for the respective functions and the countermeasures related to the predetermined number of functions are displayed on the display unit, the control unit performs control to display a menu screen on the display unit for selecting a desired function to be stopped among the plurality of functions.

7. The imaging apparatus according to claim 6, wherein the control unit performs control to display the menu screen on the display unit such that a manipulation region for selecting the predetermined number of functions to be stopped is displayed in a different way from that of another manipulation region for indicating functions not to be stopped.

8. The imaging apparatus according to claim 1, wherein the calculation unit calculates the power consumptions for the respective functions during a plurality of periods as the predetermined periods for the respective periods, and
wherein the control unit performs control to display the power consumptions for the respective functions, which are calculated during a period selected by a manipulation of a user from among the plurality of periods, on the display unit.

9. The imaging apparatus according to claim 1, wherein, when a residual amount of a battery which is built in or mounted on the imaging apparatus is lower than a predetermined value used as a reference, the control unit performs control to set a specific mode to automatically reduce power consumptions related to one or more functions having the calculated power consumptions which are greater than a predetermined value used as a reference.

10. A method of controlling an imaging apparatus, comprising:
calculating power consumptions related to a plurality of functions during a predetermined period for the respective functions; and
displaying data of the calculated power consumptions for the respective functions and countermeasures to be used to reduce the power consumptions related to a predetermined number of functions among the plurality of functions, on a display unit,
wherein the displaying the countermeasures relates to functions which satisfy a predetermined condition among the plurality of functions on the display unit, and
wherein the displaying data employs one or more functions having the calculated power consumptions which are higher than a predetermined value used as a reference, as functions which satisfy the predetermined condition, and displays the countermeasures related to the functions which satisfy the predetermined condition on the display unit.

11. A non-transitory computer-readable storage medium having executable instructions stored therein, which when executed cause a computer to:
calculate power consumptions related to a plurality of functions during a predetermined period for the respective functions; and
display data of the calculated power consumptions for the respective functions and countermeasures to be used to reduce the power consumptions related to a predetermined number of functions among the plurality of functions, on a display unit,
wherein the displaying the countermeasures relates to functions which satisfy a predetermined condition among the plurality of functions on the display unit, and
wherein the displaying data employs one or more functions having the calculated power consumptions which are higher than a predetermined value used as a reference, as functions which satisfy the predetermined condition, and displays the countermeasures related to the functions which satisfy the predetermined condition on the display unit.

12. The method according to claim 10, wherein the displaying includes distinguishably displaying the calculated power consumptions for the respective functions on the display unit.

13. The method according to claim 10, further comprising, when a residual amount of a battery which is built in or mounted on the imaging apparatus is lower than a predetermined value used as a reference, displaying the data of the calculated power consumptions for the respective functions and the countermeasures related to the predetermined number of functions on the display unit.

14. The method according to claim 10, wherein the plurality of functions are capable of being stopped or changed by a manipulation of a user.

15. The method according to claim 10, further comprising, after the data of the power consumptions for the respective functions and the countermeasures related to the predetermined number of functions are displayed on the display unit, displaying a menu screen on the display unit for selecting a desired function to be stopped among the plurality of functions.

16. The method according to claim 15, wherein the displaying the menu screen on the display unit includes displaying a manipulation region for selecting the predetermined number of functions to be stopped in a different way from that of another manipulation region for indicating functions not to be stopped.

17. The method according to claim 10, wherein the calculating power consumptions includes calculating power consumptions for the respective functions during a plurality of periods as the predetermined periods for the respective periods, and
wherein the displaying includes displaying the power consumptions for the respective functions, which are calculated during a period selected by a manipulation of a user from among the plurality of periods, on the display unit.

18. The method according to claim 10, further comprising, when a residual amount of a battery which is built in or mounted on the imaging apparatus is lower than a predetermined value used as a reference, setting a specific mode to automatically reduce power consumptions related to one or more functions having the calculated power consumptions which are greater than a predetermined value used as a reference.

* * * * *